Patented Oct. 8, 1929

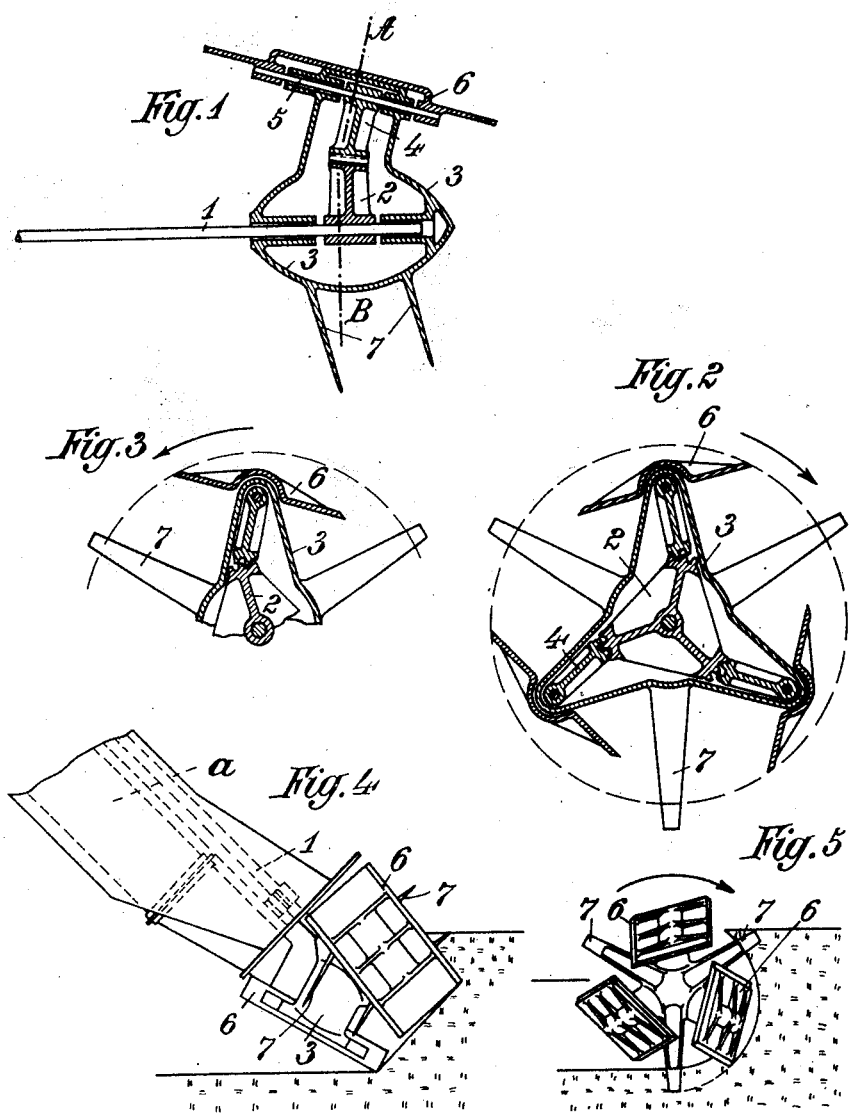

1,730,958

UNITED STATES PATENT OFFICE

PIETER van WIENEN, OF HAMBURG, GERMANY

CUTTING HEAD FOR SUCTION DREDGERS

Application filed November 26, 1928, Serial No. 322,022, and in Germany October 12, 1927.

There exist already cutting heads for suction dredgers having adjustable or rotatable bottom milling cutters sharpened at the two longitudinal edges so that they are able to cut in two directions. The cutting heads are provided with means for reversing said cutters. These latter are supported in the ends of spokes so that the bottom material taken up is conveyed into the open cutting head frame whence it is conveyed further by means of the cutters directly to the suction pipe. This entails, however, the drawback that the hinge joints of the cutters are very quickly worn off.

In order to obviate this drawback, the bottom milling cutters are, according to my invention, arranged at the circumference of a closed casing, to which preliminary cutters or cutting knives are attached between the adjustable main bottom cutters, and within which toothed arms are attached to the axles of said bottom cutters, these arms engaging a toothed disk, preferably of triangular shape, secured to the driving shaft.

The invention is illustrated diagrammatically and by way of example on the accompanying drawing, on which Figure 1 is a vertical longitudinal section through a cutting head designed according to this invention; Figure 2 is a transverse section in the plane A—B of Fig. 1; Figure 3 shows a part of said transverse section, the movable members being in another position; Figure 4 is a side-view, showing the cutting head attached to a suction dredger; and Figure 5 is a front-view of the lower part of Fig. 4.

On the drawing, 1 (Figs. 1 and 4) indicates the driving shaft for actuating the bottom milling cutters; it is supported upon the suction tube $a$ (Fig. 4) and driven by a reversing engine. The casing 3 of the cutting head is arranged loosely on the shaft 1 so that it can easily be turned thereon, and is provided with three radial extensions serving as supports or bearings for three axles 5 which can be adjusted simultaneously and uniformly by transmitting members 2 and 4 (Figs. 1–3), of which 2 is affixed to the shaft 1 and can be actuated by it. The member 2 is practically triangular and its toothed corners engage toothed inner ends of the transmitting members 4 which are firmly secured to said axles. Also the casing 3 is practically triangular; it carries, by the intermediary of the axles 5, the three main cutting knives 6, and is provided, besides, with auxiliary or preliminary cutting knives 7 which extend radially outwardly between the knives 6 in the manner shown particularly distinctly in Fig. 2.

The casing 3 which is, as has already been explained, arranged loosely upon the shaft 1 is nevertheless rotated by it, in that the power is transmitted to it by means of the triangular member 3 which is affixed to said shaft and the corners of which contact with the casing wall in the manner shown in Figs. 2 and 3. Instead of employing the casing wall as abutments, separate abutment members may be provided within the casing. The knives 6 and 7 are sharp at both edges and can, therefore, cut the ground in either direction of the cutting head. Each corner of the triangular member 2 can contact with the one or the other side of the appertaining extension of the casing, according to the direction of rotation of the shaft 1, but prior to the actual happening of the three contacts between the member 2 and the wall of the casing the arms 4 will be turned by the member 2, also the axles 5 will thereby be turned, and the knives 6 will be correspondingly adjusted, that is to say, automatically adjusted according to the direction of rotation of the shaft 1. Immediately thereafter the member 2 will contact with the wall of the casing and now this latter will be rotated and the knives will do their work. In Figs. 2 and 3 the two directions of rotation are indicated by arrows, and it is distinctly to be seen that the positions of the movable parts 2, 4 and 6 are correspondingly different.

Particularly important and valuable advantages presented by the above-described improved cutting head are the absolutely positive reversal of the main cutting knives 6 when the direction of rotation of the shaft 1 is reversed, and the provision of the preliminary cutting knives 7 just in front of the acting cutting edges of said knives 6.

I claim:

1. A cutting head for suction dredgers, comprising, in combination, a rotary casing arranged loosely upon the cutting head driving shaft, adjustable main cutting knives attached to said casing, and preliminary cutting knives also attached to said casing.

2. A cutting head for suction dredgers, comprising, in combination, a rotary casing arranged loosely upon the cutting head driving shaft, adjustable main cutting knives attached to said casing, and non-adjustable preliminary cutting knives extending radially forth from the said casing and being arranged in alternation with said main knives.

3. A cutting head for suction dredgers, comprising, in combination, a rotary casing arranged loosely upon the cutting head driving shaft, adjustable main cutting knives attached to said casing, preliminary cutting knives also attached to said casing, and main-knife reversing means arranged within the said casing.

4. A cutting head for suction dredgers, comprising, in combination, a rotary casing arranged loosely upon the cutting head driving shaft and having radially directed extensions, adjustable main cutting knives attached to said extensions, non-adjustable preliminary cutting knives extending radially forth from said casing between the extensions thereof, and automatically acting main-knife reversing means arranged within the said casing and adapted to transmit power from said shaft to the main cutting knives, substantially as set forth:

In testimony whereof I affix my signature.

PIETER van WIENEN.